United States Patent [19]
Taylor et al.

[11] 3,739,641

[45] June 19, 1973

[54] REMOTE READING GAUGE INDICATOR UNIT

[76] Inventors: Leta S. Taylor; Paul B. Johnson; Eugene D. Huskey, all of Box 529, Garland, Tex. 75040

[22] Filed: May 5, 1971

[21] Appl. No.: 140,334

[52] U.S. Cl. .................. 73/313, 73/DIG. 5, 338/33
[51] Int. Cl. ............................................. G01f 23/10
[58] Field of Search .................... 73/308, 313, 317, 73/DIG. 5; 340/266; 338/33

[56] References Cited
UNITED STATES PATENTS

| | | | |
|---|---|---|---|
| 2,620,412 | 12/1952 | Ford | 73/317 X |
| 2,325,582 | 8/1943 | Anderson | 73/DIG. 5 |
| 2,827,621 | 3/1958 | Reichert et al. | 340/266 X |
| 3,394,594 | 7/1968 | Pooley et al. | 73/431 |
| 3,339,413 | 9/1967 | Taylor et al. | 73/317 |
| 2,266,298 | 12/1941 | Bacon | 73/317 X |
| 1,937,231 | 11/1933 | Klein | 73/317 X |

*Primary Examiner*—Richard C. Queisser
*Assistant Examiner*—Daniel M. Yasich
*Attorney*—Frederick W. Turnbull

[57] ABSTRACT

A remote reading indicator unit for a liquid level gauge in which a magnet, rotated by movement of a float, actuates a magnet within a sealed indicator unit, said unit including a variable resistance element to be electrically connected in a circuitry connected to a gauge dial at a remote point.

7 Claims, 8 Drawing Figures

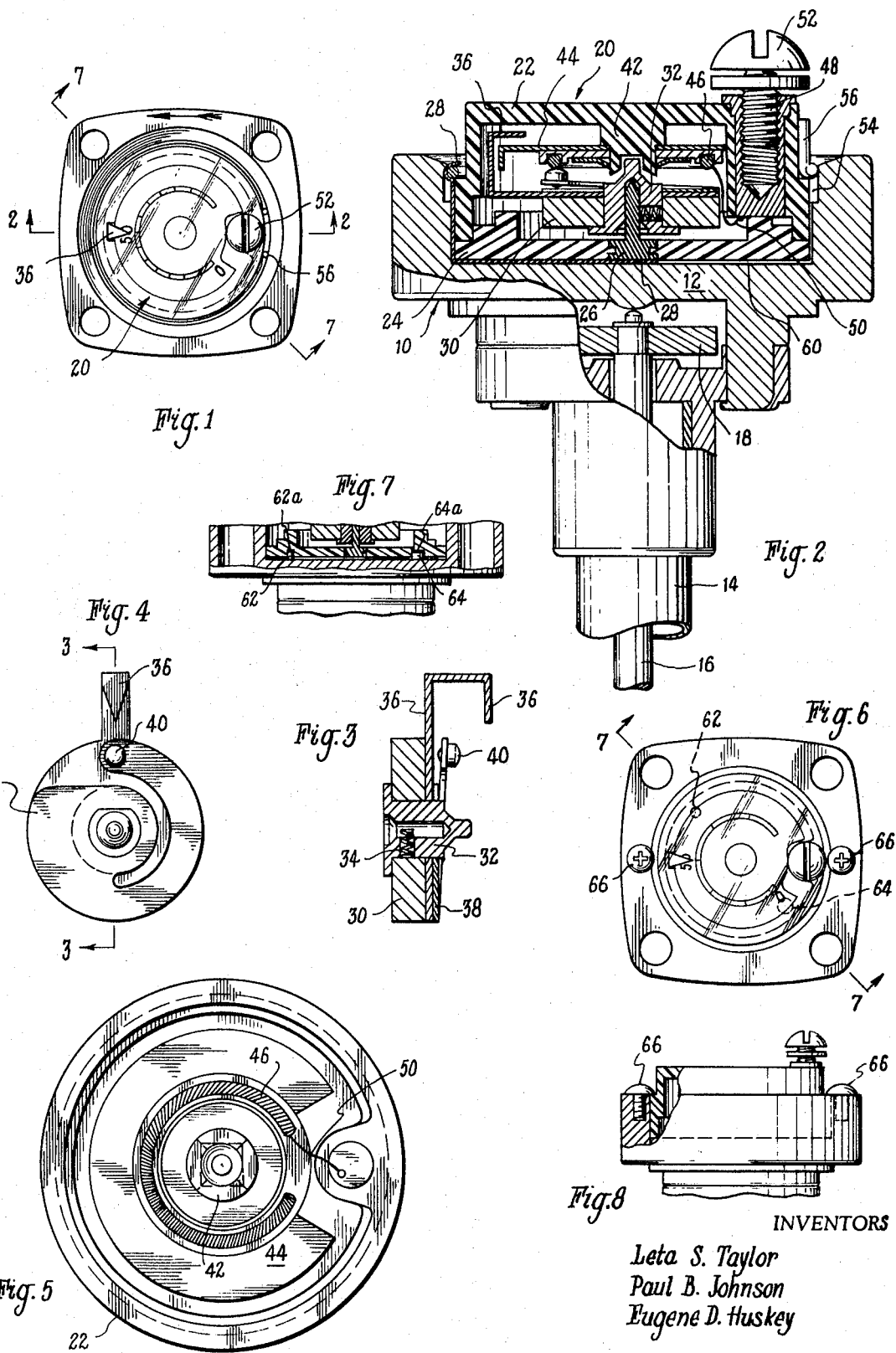

REMOTE READING GAUGE INDICATOR UNIT

Liquid level gauges are known such as the Taylor U.S. Pat. No. 2,578,104 in which a magnet is rotated by change of position of a float within a tank, which, in turn rotates a second magnet sealed from the contents of the container. A remote reading float operated gauge is suggested by U.S. Pat. No. 1,676,255, but such a gauge is undesireable for use especially where the contents of the tank are volatile flammable materials such as L.P. gas and fuels for internal combustion engines, and is even less useful where the tank on which the gauge is mounted is located in a poorly ventilated space, such as the bilges of a power boat where flammable vapors from many sources may accumulate and any possibility of a spark that might cause the flammable vapors to ignite must be avoided.

It is a primary object of the present invention to provide a liquid level gauge unit in which the driven magnet not only supports and rotates an indicating needle to provide for reading the gauge directly, but also provides electrical circuitry that is entirely enclosed and sealed against a possibility of a flammable vapor penetrating the enclosure by which the possibility of ignition of a flammable vapor surrounding the tank is avoided.

It is a further object of the invention to provide a compact unit for mounting in a gauge head in which the unit contains the second magnet, the electrical elements, the dial and the pointer for direct reading of the dial, a ground lead and a terminal for connecting the electrical elements within the unit to a dial at a distant point.

The unit of the present invention being also readily removable and replaceable without hazard of changing the zero setting or calibration of the instrument provides for accurate and inexpensive manufacture and ease of replacement.

Other and further objects and advantages will appear from the following specification taken with the accompanying drawing in which like reference characters refer to like elements in the several views and in which:

FIG. 1 is a front view of the gauge showing the dial and pointer for local reading;

FIG. 2 is a broken away enlarged side view showing the gauge element itself in section line 2—2 of FIG. 1;

FIG. 3 is an enlarged sectional view of the rotor taken on line 3—3 of FIG. 4;

FIG. 4 is a front or top view of the rotor of FIG. 3;

FIG. 5 is a view of the lower surface of the dial, showing the variable resistance.

FIG. 6 is a view similar to FIG. 1 showing an alternate means to secure the gauge element in the gauge head;

FIG. 7 is a section taken on line 7—7 of FIG. 6, or on a similar line on FIG. 1 showing the use of projections in the gauge head of different sizes to require proper installation of the gauge element in the head; and FIG. 8 is an elevation of FIG. 6 broken away to show an alternative means to secure the indicator unit in the head.

The head 10 of the gauge is to be bolted to the tank and includes a closure portion 12 so that there can be no passage for liquid or gas past the head. On the inner side of head 10 a tube 14 extends into the interior of the tank. A rotatable shaft 16 lies within the tube 14 and extends to the end of tube 14. A conventional pivoted float arm (not shown) is geared to shaft 16. A magnet 18 is fixed to the shaft 16 at its end adjacent closure portion 12 of the head 10.

Head 10 is provided with a cylindrical depression on its outer side to receive the indicator unit 20.

Indicator unit 20 includes a casing formed of two parts 22 and 24 of plastic material. Element 22 is preferably of transparent plastic to permit visual reading of the gauge. Parts 22 and 24 are welded or otherwise sealed together to enclose the operative parts of the indicator unit.

Centrally of the part 24 a pivot 26 of electrically conductive material is provided extending through plastic 24. A ground lead 28, electrically connected to pivot 26 on the outer surface of part 24 extends radially outwardly and upwardly to a position to be clamped into contact with head 10 as will be explained below.

A magnet 30 is mounted within the unit on pivot 26 by a metallic hub 32. Since the pivot is of the needle type, a contact spring 34 is mounted in hub 32 to bear against pivot 26 to assure an electrical connection between the pivot connected to said ground lead 28, and the hub 32. At the top of hub 32 an indicator pointer 36 extends radially outwardly, then upwardly and finally inwardly to provide a pointer for visual reading of the gauge.

A contact spring 38 fits tightly on hub 32. Stake or rivet means may be used to assure a good electrical contact between hub 32 and spring 38. An upwardly facing electric contact element 40 is mounted on the end of spring 38.

A coaxial boss 42 on the part 22 of casing 20 extends downwardly but does not normally engage hub 32 but prevents more than very limited upward movement of magnet 30, hub 32 and the pointer 36. A fixed gauge dial 44 is mounted on boss 42 extending radially outwardly to a position such as to lie below the pointer 36.

On the lower surface of gauge dial 44 a resistance 46 is arranged in an arc of a radius agreeing with the distance of contact 40 from the center of hub 32. This resistance 46 may be a helix of wire to provide a maximum change of resistance as the contact 40 moves along its arcuate path.

Resistance 46 is electrically connected at one end to a terminal 48 by a wire 50. Terminal 48 is preferably a threaded socket to receive a bolt 52 to fasten a lead to an electrically operated dial (not shown) at a distant point such as a vehicle instrument panel.

It will be noted that ground lead 28 extends radially outwardly from pivot element 26 and is made preferably of a very thin strip of metal. The assemblage described above, except for ground lead 28 is entirely enclosed within casing parts 22 and 24 which are sealed together. This assemblage is of such a size as to fit into the recess in head 10 of the gauge. An annular groove 54 is provided as seen in FIG. 2 on the interior of the recess in head 10, so that a snap ring 56 may be used to securely hold the assemblage 20 in the recess. It will be noticed that snap ring 56 presses the ground connection 28 tightly against head 10 which is of metal and which, in use, is securely bolted to the tank. An alternative means to hold the gauge unit in the head is seen in FIGS. 6 and 8 where it will be understood ground connection 28 will be clamped under a screw 66.

The electrically operated dial (not shown) is grounded in a conventional manner to form an electrical connection to ground 28. The structure and operation of such an electrically operated dial is known.

The assemblage is calibrated at the factory when made to agree with the specific guage head 10 with which it is to be used. The guage head is provided with indicia in the form of an arrow to assure its being installed in the tank in an operative position. In order to assure proper positioning of the assemblage in the head, one or more projections 62 or 64 are provided on wall 12 of head 10 which cooperate with recess 62a or 64a in the bottom surface of part 24 of the indicator unit 20. The projections 62, 64 on wall 12 may be arranged in a code to cooperate only with corresponding recesses 62a and 64a in the bottom surface of a unit 20 calibrated for that gauge head 10. While projections 62 and 64 are shown as being of different sizes, with correspondingly sized holes 62a and 64a, such projections may be the same size but not in alignment on a diameter of the recess.

Having thus disclosed the invention I claim:

1. An indicator unit for a gauge of the type having a float-operated rotatable magnet positioned within a gauge head, said unit comprising an upper casing part including a central boss and a lower casing part of insulating material carrying a centrally positioned metallic pivot, a magnet mounted on said pivot in the said lower casing part to follow the movement of a magnet positioned within the gauge head, an indicator dial supported by said boss in said upper casing part positioned above said pivotally mounted magnet, an indicating pointer mounted on said pivotally mounted magnet so configured as to extend from below over the peripheral edge of said indicator dial, a variable resistance wire mounted along an arc on the underside of said indicator dial, a sliding contact mounted on said pivotally mounted magnet to contact said variable resistance wire at successive points along its length as said pivotally mounted magnet pivots, ground means exterior to said lower casing part electrically connected to said sliding contact, by way of said pivot, and an electric terminal means accessible to the exterior of said unit operatively connected to one end of said variable resistance wire and sealed in said upper casing part to be connected to a remote meter.

2. The indicator unit of claim 1, for a gauge having a gauge head formed with a depression adapted to receive said indicator unit, and having an annular groove provided about said depression, said indicator unit being held within said depression by an expansible snap ring surrounding said unit and contacting said ground means.

3. The indicator unit of claim 2 for a gauge having a metallic gauge head, in which said ground means comprises a strip of flat metal electrically connected to said pivot and extending radially exteriorly of said lower casing part as to be clamped by said expansible snap ring in electrical contact with said gauge head.

4. The combination of claim 2, in which said gauge head is provided with at least one projection and said indicator unit is provided with a corresponding depression positioned so that the said unit can be assembled with said head in only one position.

5. In the indicator unit of claim 1, for a gauge having a head formed with a depression adapted to receive said indicator unit, said indicator unit being provided with shoulder means, said gauge head being provided with threaded sockets adjacent said depression, and headed bolt means adapted to be mounted in said threaded sockets with the heads thereof engaging said shoulder means.

6. In the indicator of claim 5, in which said ground means extends radially outwardly and upwardly from said metallic pivot to said shoulder to be clamped by engagement under the head of one of said headed bolt means.

7. An indicator unit for a gauge of the type having a float rotatable magnet positioned within a gauge head, said indicator unit being a unitary assembly to be readily assembled with and removed from said gauge head, said indicator unit comprising a transparent upper and lower casing part, a central boss having a central depression formed on the inner side of said upper part, a radially extending dial carrying a variable resistance wire on the underside thereof and mounted on said boss, a pivot mounted centrally of said lower casing part, a magnet carrying a sliding contact mounted for free rotation on said pivot to contact said variable resistance wire, a pointer mounted for rotation with said magnet extending in a direction radially from said pivot and extending upwardly and radially inwardly at its end remote from said pivot to extend over the peripheral edge of said gauge dial, said magnet being provided with a central projection to extend loosely into said depression in said boss whereby said magnet is held in assembled position with respect to said dial during assembly and to prevent excessive movement of said magnet axially of said pivot during shipment or use.

* * * * *